United States Patent
Liu

(10) Patent No.: US 11,308,232 B2
(45) Date of Patent: Apr. 19, 2022

(54) ASSESSING DATA LEAKAGE RISKS

(71) Applicant: Google LLC, Mountain View, CA (US)

(72) Inventor: Yin Liu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 448 days.

(21) Appl. No.: 16/464,109

(22) PCT Filed: Jun. 5, 2018

(86) PCT No.: PCT/US2018/036001
§ 371 (c)(1),
(2) Date: May 24, 2019

(87) PCT Pub. No.: WO2019/236060
PCT Pub. Date: Dec. 12, 2019

(65) Prior Publication Data
US 2021/0117564 A1    Apr. 22, 2021

(51) Int. Cl.
*G06F 16/245* (2019.01)
*G06F 21/64* (2013.01)
(Continued)

(52) U.S. Cl.
CPC ........ *G06F 21/6227* (2013.01); *G06F 16/245* (2019.01); *G06F 16/283* (2019.01); *G06F 21/64* (2013.01)

(58) Field of Classification Search
CPC .... G06F 21/552; G06F 16/245; G06F 21/554; G06F 21/577
See application file for complete search history.

(56) References Cited

U.S. PATENT DOCUMENTS

| 8,145,682 B2 | 3/2012 | McSherry et al. |
| 8,375,030 B2 | 2/2013 | Rane et al. |

(Continued)

FOREIGN PATENT DOCUMENTS

| EP | 3244336 | 11/2017 |
| JP | 2017-204277 | 11/2017 |

OTHER PUBLICATIONS

PCT International Preliminary Report on Patentability in International Application No. PCT/US2018/036001, dated Dec. 17, 2020, 8 pages.
IN Office Action in Indian Appln. No. 201927031105, dated May 31, 2021, 8 pages.
JP Notice of Allowance in Japanese Appln. No. 2019547320, dated Feb. 1, 2021, 5 pages (with English translation).

(Continued)

*Primary Examiner* — Scott T Baderman
*Assistant Examiner* — Mario M Velez-Lopez
(74) *Attorney, Agent, or Firm* — Fish & Richardson P.C.

(57) ABSTRACT

Systems, devices, methods and other techniques for assessing data leakage risks in a computing environment. A computing system receives interaction data and query data for a party. The system determines dimension combinations represented in the interaction data and identifies, for each query described in the query data, each dimension combination that appears in a result to the query. The system generates, for each dimension combination, a query membership tag that identifies each query for which the dimension combination appears in a result to the query. The system determines, for each unique query membership tag, a count of a number of entities that are associated in the interaction data with any interaction having a dimension combination that corresponds to the query membership tag. The system assesses a data leakage risk for the party based on the counts for one or more unique query membership tags.

20 Claims, 7 Drawing Sheets

(51) Int. Cl.
  *G06F 21/62*   (2013.01)
  *G06F 16/28*   (2019.01)

(56) References Cited

U.S. PATENT DOCUMENTS

| | | | |
|---|---|---|---|
| 8,661,047 | B2 | 2/2014 | Talwar et al. |
| 9,672,364 | B2 | 6/2017 | Zhang et al. |
| 9,954,965 | B2* | 4/2018 | Cooper ............... H04L 63/102 |
| 9,977,920 | B2* | 5/2018 | Danielson .......... G06F 16/9535 |
| 10,079,935 | B1* | 9/2018 | Flores ................ H04L 63/0407 |
| 11,113,413 | B2* | 9/2021 | Klucar, Jr. ......... G06F 16/2455 |
| 11,138,643 | B2* | 10/2021 | Caldwell .............. G06Q 30/06 |
| 2011/0238611 | A1* | 9/2011 | McSherry ............... G06N 5/04 706/52 |
| 2014/0283091 | A1* | 9/2014 | Zhang ................... G06F 17/18 726/26 |
| 2015/0286827 | A1 | 10/2015 | Fawaz et al. |
| 2017/0006135 | A1* | 1/2017 | Siebel ................. H04L 67/2833 |
| 2017/0169253 | A1 | 6/2017 | Curcio et al. |
| 2017/0364539 | A1* | 12/2017 | Jacob .................... G06F 16/213 |
| 2019/0377902 | A1* | 12/2019 | Schroeder .............. G06N 20/20 |
| 2021/0240853 | A1* | 8/2021 | Carlson ................. G16H 10/20 |

OTHER PUBLICATIONS

Dimitrakakis et al., "Differential Privacy for Bayesian Inference through Posterior Sampling," Journal of Machine Learning Research, Mar. 2017, 39 pages.
Dwork, "Differential Privacy," Microsoft Research, Jul. 2006, 12 pages.
Dwork, "The Algorithmic Foundation of Differential Privacy," Foundations and Trends in Theoretical Computer Science, 2014, 281 pages.
Hinke et al., "Protecting databases from inference attacks," Elsevier Science Limited, 1997, 22 pages.
Hylkema, "A survey of database inference attack prevention methods," Semantics Scholar, Dec. 2009, 11 pages.
Jung et al., "A noise parameter configuration technique to mitigate detour inference attack on differential privacy," IEEE Xplore, Feb. 2017.
Kairouz et al., "The Composition Theorem for Differential Privacy" IEEE Xplore, Mar. 2017, 10 pages.
PCT International Search Report and Written Opinion in International Appln. No. PCT/US2018/036001, dated Feb. 7, 2019, 15 pages.
Rinott et al., "Confidentiality and Differential Privacy in the Dissemination of Frequency Tables," Statistical Science, Nov. 2018, 38 pages.

* cited by examiner

300

| 302 | 304 | 306 | 308 | 310 |
|---|---|---|---|---|
| Third Party Website | Notification Item Interaction Device | Conversion Device | Conversion Location | Number of Conversions |
| www.SiteA.com | Desktop | Mobile | US | 101 |
| www.SiteB.com | Mobile | Mobile | US | 200 |
| www.SiteC.com | Desktop | Mobile | US | 89 |
| www.SiteC.com | Mobile | Desktop | US | 57 |
| ... | ... | ... | ... | ... |

| 402 | 404 | 406 | 408 |
|---|---|---|---|
| Conversion ID | Conversion Day | User ID | Third Party Website |
| C1 | Day 1 | User1 | SiteA |
| C2 | Day 1 | User2 | SiteB |
| C3 | Day 2 | User3 | SiteA |
| C4 | Day 3 | User4 | SiteA |
| C5 | Day 3 | User5 | SiteB |

| Dimension Combination (802) | Query Membership Tag (QF1&2, QG1&2, QH1&2) (804) |
|---|---|
| Day 1 | (1, 0, 1) |
| Day 2 | (1, 1, 1) |
| Day 3 | (0, 1, 1) |

| Query Membership Tag (QF1&2, QG1&2, QH1&2) (902) | Dimension Combination(s) (904) | Associated User IDs (906) |
|---|---|---|
| (1, 0, 1) | {Day 1} | {User1, User2} |
| (1, 1, 1) | {Day 2} | {User3} |
| (0, 1, 1) | {Day 3} | {User4, User5} |

ASSESSING DATA LEAKAGE RISKS

CROSS-REFERENCE TO RELATED APPLICATION

This application is a National Stage Application under 35 U.S.C. § 371 and claims the benefit of International Application No. PCT/US2018/036001, filed Jun. 5, 2018. The disclosure of the foregoing application is hereby incorporated by reference in its entirety.

TECHNICAL FIELD

This document generally describes technology for assessing data leakage risks in a computing environment.

BACKGROUND

Data systems can receive queries and provide aggregated query results, such that specific information about individuals described in the results data is not revealed. However, differential query attacks may be attempted in which an attacker issues multiple queries with different query parameters, and infers information about particular individuals through analysis of the results data. Some systems add statistical noise to the results data to thwart differential query attacks.

SUMMARY

This document generally describes computer-based technology (e.g., systems, devices, methods, and other techniques) for assessing data leakage risks in a computing environment. The systems, devices, and techniques described herein include using an efficient process to perform an initial filtering of queries that have been issued by an information requestor, to identify a subset of the queries that may be involved in a differential query attack by the information requestor. After performing the initial filtering process, for example, a relatively comprehensive process may be used to confirm whether the subset of queries has resulted in an actual data leak. Additional techniques may be used to apply suitable controls to queries submitted by the information requestor, thus protecting user data privacy.

Some implementations of the subject matter disclosed herein include a computer-implemented method. The method includes receiving, by a computing system, interaction data for a party. The interaction data can describe a set of interactions that have occurred between the party and a plurality of entities. The interaction data can further identify, for each interaction, (i) values for one or more dimensions of the interaction and (ii) an entity identifier for one of the plurality of entities that participated in the interaction with the party. The system receives query data for the party. The query data can describe a plurality of queries issued by the party with respect to the set of interactions that have occurred between the party and the plurality of entities. The system determines a plurality of dimension combinations, each dimension combination corresponding to a different combination of values for the one or more dimensions represented in the interaction data. The system identifies, for each query of the plurality of queries described in the query data, each dimension combination from the plurality of dimension combinations that appears in a result to the query. The system generates, for each dimension combination of the plurality of dimension combinations, a query membership tag that identifies each query from the plurality of queries for which the dimension combination appears in a result to the query. The system determines, for each unique query membership tag, a count of a number of entities that are associated in the interaction data with any interaction having a dimension combination that corresponds to the query membership tag. The system assesses a data leakage risk for the party based on the counts for one or more unique query membership tags.

These and other implementations can optionally include one or more of the following features.

Receiving the interaction data for the party can include receiving conversion interaction data that is known to the party, the set of interactions including conversion interactions that have occurred between the plurality of entities and one or more web properties of the party. The conversion interaction data may be received from the party.

Receiving the interaction data for the party can include receiving non-conversion interaction data that is unknown to the party, the set of interactions including non-conversion interactions that have occurred between the plurality of entities and one or more third party web properties. The non-conversion interaction data may be received from a notification item provision system.

The plurality of dimension combinations determined by the computing system may include only conversion interactions values that are known to the party.

Two or more different dimension combinations that appear in a same result to the query may have a same query membership tag.

Assessing the data leakage risk for the party can include determining whether the count of the number of entities for any of the unique query membership tags is under an identifiable threshold value.

After identifying a potential data leak corresponding to a given query membership tag based on assessing the data leakage risk for the party, a differential query analysis of combinations of queries identified in the given query membership tag can be performed to determine whether an actual data leak occurred.

In response to determining that the actual data leak has occurred, one or more security actions can be performed. The one or more security actions can include restricting further queries issued by the party. The one or more security actions may be automatically performed by the computing system. The one or more security actions may be performed after receiving input from an administrator of the computing system.

Some implementations of the subject matter disclosed herein include one or more computer-readable media (e.g., non-transitory media) having instructions stored thereon that, when executed by one or more processors, cause the processors to perform operations for any of the methods disclosed herein. In some implementations, a computing device includes the one or more processors and the one or more computer-readable media.

The systems, devices, program products, and processes described throughout this document can, in some instances, provide one or more of the following advantages. Differential query attacks can be detected, without adding statistical noise to query results that cause the results to be inaccurate. A lightweight process can be used to identify a subset of issued queries that may be involved in a differential query attack, and a comprehensive process can then be used to confirm whether the subset of queries has resulted in an actual data leak, thus conserving computing resources while performing faster query analysis. Potentially malicious information requestors can be identified and suitable controls may be applied, thus protecting user data privacy.

The details of one or more embodiments are set forth in the accompanying drawings and the description below. Other features and advantages will be apparent from the description and drawings, and from the claims.

BRIEF DESCRIPTION OF DRAWINGS

FIG. 3 shows an example query result.

FIG. 4 shows an example of interaction data.

FIG. 8 shows an example of query membership tag data.

FIG. 9 shows an example of entity association data for query membership tags.

Like reference symbols in the various drawings indicate like elements.

DETAILED DESCRIPTION

This document generally describes systems, devices, and techniques for assessing data leakage risks in a computing environment. For example, information requestors can submit queries to a resource interaction tracking system to obtain information about interactions (e.g., viewing, clicking, or other sorts of interactions) that have been performed with respect to various digital resources (e.g., web pages, documents, media content, or other sorts of resources) available through a computer network (e.g., a local network, the Internet, or another sort of network). In response to the queries, the system can provide aggregated information about the interactions, for example, to protect the privacy of individuals that have performed the interactions. Some of the interactions may already be known to the information requestors, such as interactions that involve accessing resources that are managed by the information requestors. Some of the interactions may not be known to the information requestors, such as interactions that involve accessing resources that are not managed by the information requestors. In an attempt to gain such unknown interaction information, for example, the information requestors can perform differential query attacks that may include submitting multiple different queries that isolate small groups of individuals, analyzing differences between the query results, and inferring information for the small groups of individuals (or particular individuals) based on the analysis.

In general, assessing data leakage risks caused by differential query attacks may involve vast computing resources (e.g., memory and storage space), and may require a significant amount of time, due to query results possibly returning many rows that aggregate information for many different individuals performing many different interactions with many different digital resources. Thus, comparing query differences to discover a potential differential query attack is generally computationally expensive. The systems, devices, and techniques described herein include using a relatively lightweight process to perform an initial filtering of queries that have been issued by an information requestor, to identify a subset of the queries that may be involved in a differential query attack. After performing the initial filtering process, a relatively comprehensive process is used to confirm whether the subset of queries has resulted in an actual data leak. Thus, computing resources may be conserved while performing a faster query analysis. Potentially malicious information requestors can be identified, and suitable controls may be applied to queries submitted by the information requestors, thus protecting user data privacy.

Figure 1:
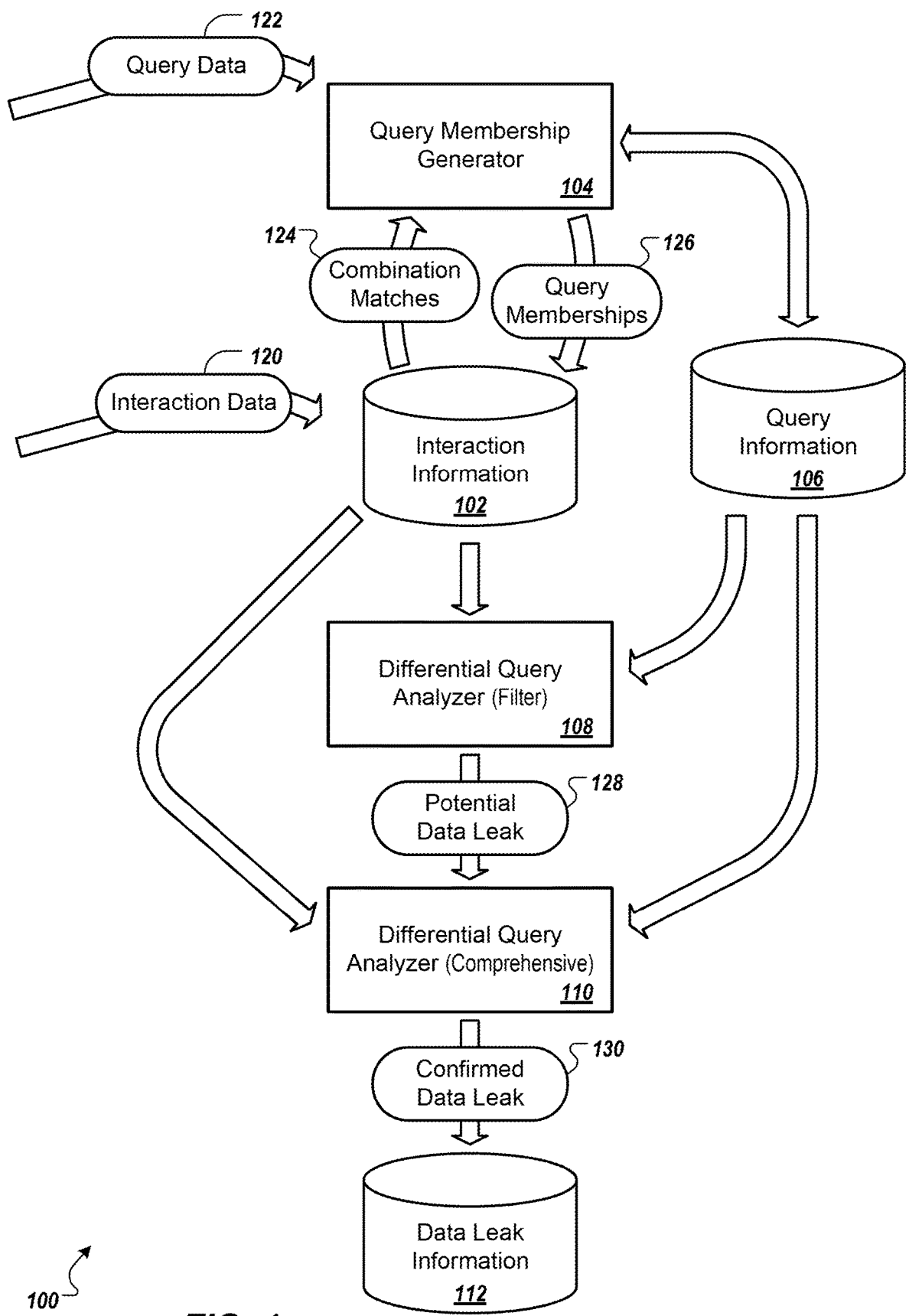
FIG. 1 is a block diagram of an example system for assessing data leakage risks in a computing environment.

FIG. 1 is a block diagram of an example system 100 for assessing data leakage risks in a computing environment. For example, the system 100 may be associated with (or part of) a resource interaction tracking system (not shown). Briefly, the system 100 includes an interaction information data store 102, for example, that receives and stores interaction data 120 for a party that describes interactions between the party (e.g., an organization) and various entities (e.g., Internet users). The system 100 also includes a query information data store 106, for example, that receives and stores query data 122 related to queries issued by the party for the interactions. In general, the system 100 can use a differential query analyzer (filter) 108 to perform a lightweight process to identify a potential data leak 128, and can then use a comprehensive differential query analyzer 110 to determine whether a confirmed data leak 130 occurred. Confirmed data leak information can be stored in a data leak information data store for performing various security actions, such as providing data leak alerts, enforcing query restrictions, and other appropriate actions. Operations performed by the system 100 are described in further detail with respect to the additional figures and description herein.

Figure 2:
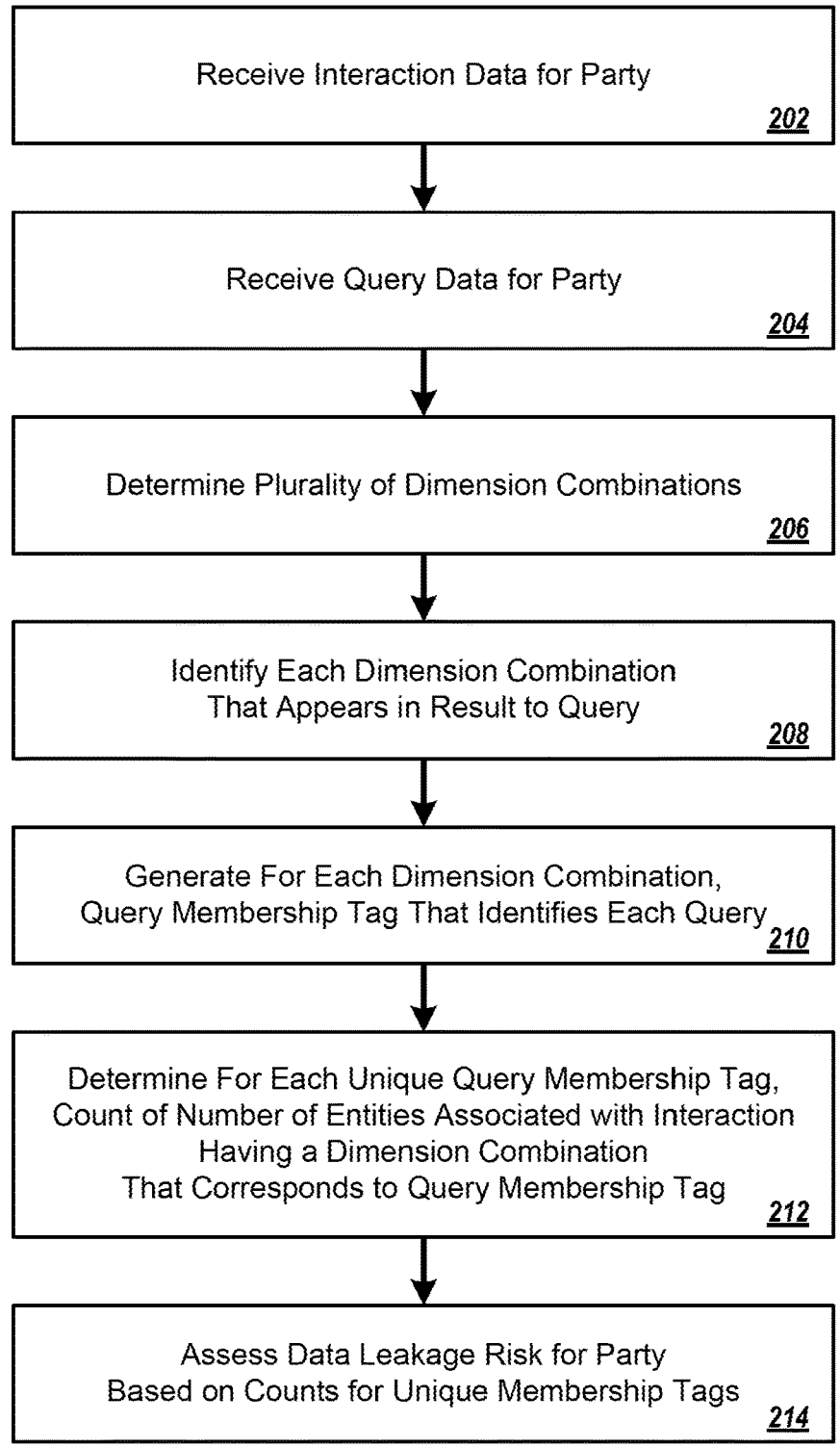
FIG. 2 is a flowchart of an example technique for assessing data leakage risks in a computing environment.

FIG. 2 is a flowchart of an example technique 200 for assessing data leakage risks in a computing environment. The example technique can be performed by any of a variety of appropriate systems, such as the system 100 (shown in FIG. 1).

Interaction data for a party is received (202). Referring to FIG. 1, for example, interaction data 120 is received by the system 100 for storage by the interaction information data store 102. The interaction data 120, for example, can describe a set of interactions that have occurred between a party and a plurality of entities.

In some implementations, the set of interactions that have occurred between the party and the plurality of entities may include interactions that have occurred between the entities and one or more web properties (e.g., websites) of the party. For example, the plurality of entities may include internet users, and the party may be an organization with an internet presence, such as a website. Users can visit the organization's website and can perform various interactions, such as interacting with various pages, content, and/or products included on the website, to describe a few examples. In general, these sorts of user interactions between the party and the plurality of entities are known to the party, and may be referred to as conversion interactions. In some implementations, conversion interaction data included in the interaction data 120 may be provided to the system 100 by the party.

In some implementations, the set of interactions that have occurred between the party and the plurality of entities may include interactions that have occurred between the entities and one or more third party web properties (e.g., websites) that are not maintained by the party. These sorts of user interactions between the party and the plurality of entities may be unknown to the party, for example, and may be referred to as non-conversion (e.g., private) interactions. For example, notification items (e.g., information widgets, website links, advertisements, or other items that notify users of content available on the party's website) can be provided by the party for presentation on various third party websites, and can include information that may lead a user to perform a conversion interaction on the party's website. When a user interacts with a notification item (e.g., the user views an information widget, clicks on a website link, or performs another sort of interaction), for example, information related to the non-conversion (e.g., private) user interaction data can be tracked by a notification item provision system that provides the notification item for presentation by the third party website (not shown), and the user can navigate to and/or can be directed to the party's website where a conversion interaction (e.g., an interaction that is known to the party) may occur. However, discrete information associated with the non-conversion (e.g., private) interaction that initiated the conversion interaction may not be provided to the party by the notification item provision system, to maintain user privacy. For example, it may not be appropriate to provide the party with information that links activity on particular third party websites to particular users. In some implementations, non-conversion (e.g., private) data represented in the interaction data 120 may be provided to the system 100 by the notification item provision system.

For each interaction, interaction data can identify values for one or more dimensions of the interaction, and can include an entity identifier for one of the plurality of entities that participated in the interaction with the party. For example, the interaction data 120 can include data that pertains to user actions that are known to the party (e.g., conversion interactions) and data that pertains to user actions that are unknown to the party (e.g., non-conversion or private interactions). For each conversion (e.g., known) interaction, for example, the interaction data 120 can include values for interaction dimensions such as a type of interaction (e.g., viewing, commenting, forwarding, purchasing, or another interaction type), a date/time at which the interaction occurred, a location (e.g., country, state, city, or another location) where the user was located when the interaction occurred, a device type (e.g., mobile, desktop, or another device type) used for performing the interaction, an identifier of the user that performed the interaction, and/or other appropriate types of information relevant to the interaction. For each non-conversion (e.g., private) interaction, for example, the interaction data 120 can include values for interaction dimensions such as a third party website that included a notification item, a date/time at which user interaction with the notification item occurred, a location (e.g., country, state, city, or another location) where the user was located when the interaction occurred, a device type (e.g., mobile, desktop, or another device type) used for performing the interaction, an identifier of the user that performed the interaction, and/or other appropriate types of information relevant to the interaction.

Query data for the party is received (204). Referring again to FIG. 1, for example, query data 122 is received by the query membership generator 104 of the system 100, and is stored by the query information data store 106 for further analysis. The query data 122, for example, can describe a plurality of queries issued by the party with respect to the set of interactions that have occurred between the party and the plurality of entities. For example, the plurality of queries may include queries that have been issued by the party for determining which types of conversion interactions (e.g., interactions that are known to the party) may be generally attributed to which types of non-conversion interactions (e.g., interactions that are unknown to the party and/or private). The party can, for example, issue various queries over time that each specify a time range for the query, a set of primary dimensions relevant to one or more interactions (e.g., conversion interactions and/or non-conversion interactions), and one or more aggregated dimensions, for inclusion in a query result. In some implementations, an amount of stored query data (e.g., including query dimensions and query results) may be limited to query data associated with a finite number of previously issued queries. For example, the query information data store 106 can store query data associated with an appropriate number (e.g., 10, 100, 1000, or another number) of queries that have most recently been issued by the party, according to data storage capabilities or policies of the system 100.

Referring now to FIG. 3, an example query result 300 is shown. The query result 300, for example, includes, for a specified time range (e.g., a conversion time period of Jan. 1, 2018-Jan. 31, 2018), a primary non-conversion dimension 302 (e.g., a third party website that included a particular notification item), a primary non-conversion dimension 304 (e.g., a device employed by a user for interacting with the notification item), a conversion dimension 306 (e.g., a device employed by the user for performing a conversion interaction that resulted from interacting with the notification item), a conversion dimension 308 (e.g., a location of the device used for performing the conversion interaction), and an aggregated dimension 310 (e.g., an aggregated number of conversion interactions for each unique combination of the primary dimensions 302-308). By providing dimension values that are sufficiently aggregated, for example, the query result 300 can provide a party with general information that attributes conversion (e.g., known) dimension values to non-conversion (e.g., unknown or private) dimension values, without allowing the party to link non-conversion dimension values to any particular user identifier. However, some parties may want to learn non-conversion (e.g., unknown or private) interaction information that pertains to their website users, for example, and may employ various techniques (e.g., differential query attacks) that leverage conversion (e.g., known) interaction information in an attempt to discover such unknown or private information. An example differential query attack is described below with respect to FIGS. 4 and 5A-B.

Referring now to FIG. 4, an example of interaction data 400 is shown. For example, the interaction data 400 (e.g., similar to the interaction data 120, shown in FIG. 1) describes a set of interactions that have occurred between a party (e.g., an organization that maintains a website) and a plurality of entities (e.g., Users 1-5) over a particular timespan (e.g., three days), including interactions that are known to the party and interactions that are unknown to the party. In the present example, the interaction data 400 includes a conversion identifier 402, a conversion day 404, and a user identifier 406 that are known to the party, for each conversion interaction that occurred between the various entities (e.g., users) and the party. In some implementations, the user identifier 406 may be stored using a signature value such that the identification data remains private. The interaction data 400 in the present example also includes data that references a non-conversion (e.g., private) interaction that led to each conversion interaction, in particular a third party website identifier 408 for a third party website that provided a notification item for the party's website to the user, the third party website being unknown to the party.

As shown in the present example, conversion C1 represents a conversion interaction by User1 on Day 1 (preceded by a non-conversion interaction with SiteA), conversion C2 represents a conversion interaction by User2 on Day 1 (preceded by a non-conversion interaction with SiteB), conversion C3 represents a conversion interaction by User3 on Day 2 (preceded by a non-conversion interaction with SiteA), conversion C4 represents a conversion interaction by User4 on Day 3 (preceded by a non-conversion interaction with SiteA), and conversion C5 represents a conversion interaction by User 5 on Day 3 (preceded by a non-conversion interaction with SiteB). Although the party has knowledge of the various conversion interactions for each user in the present example, the party does not have direct knowledge of the non-conversion (e.g., private) interactions that may have led to the conversion interactions, such as with which third party websites the users may have interacted, dates/times at which the interactions occurred, where the users were located when the interactions occurred, and types of devices used for performing the interactions. To attempt to discover such unknown or private information, for example, the party may issue two or more queries having different query parameters, with the goal of identifying a minimal set of interactions, such that the number of users associated with the minimal set of interactions is under an identifiable threshold value (e.g., 2 users, 10 users, 50 users, or another suitable value).

Figure 5A:
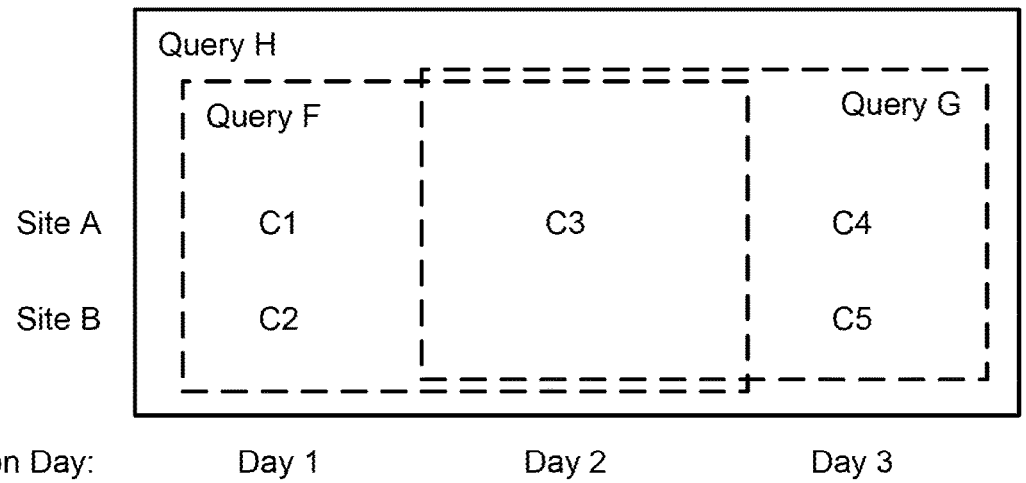
FIGS. 5A-B show example query views of interaction data.
Figure 5B:
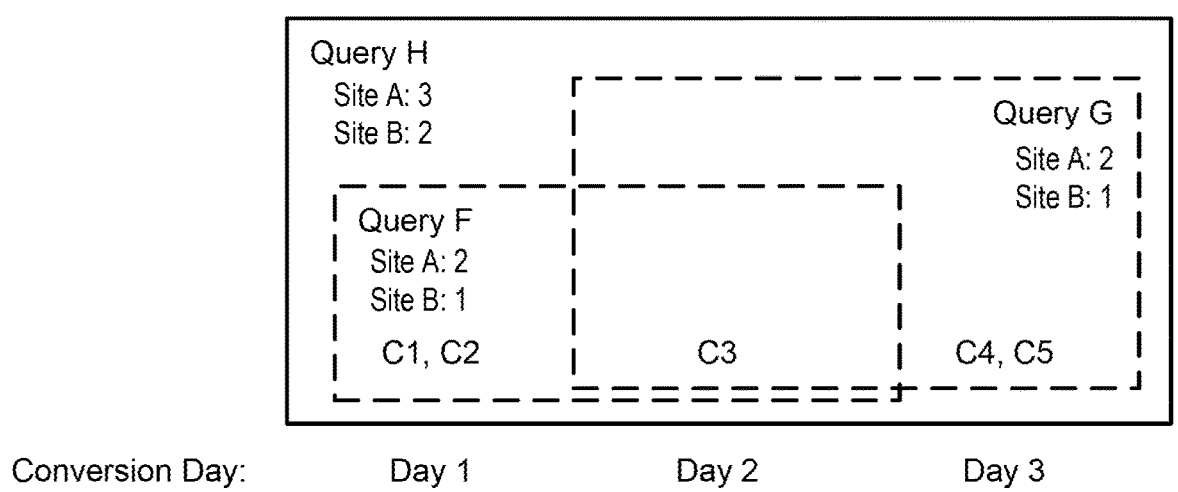

Referring now to FIGS. 5A-B, query views 500 and 550 of the interaction data 400 (shown in FIG. 4) are shown, from the perspective of the system 100 and from the perspective of a party, respectively. The query views 500 and 550 (e.g., similar to, or based on the query data 122 shown in FIG. 1), for example, can include views of conversion interaction data (e.g., known data) and non-conversion interaction data (e.g., unknown or private data) for various issued queries. In the present example, Query F returns interaction data associated with conversions that occurred over Days 1 and 2, Query G returns interaction data associated with conversions that occurred over Days 2 and 3, and Query H returns interaction data associated with conversions that occurred over Days 1, 2, and 3.

As shown in FIG. 5A, for example, the system 100 can be provided with a relatively comprehensive query view 500 of the interaction data 400 that includes data values for conversion and non-conversion interaction dimensions, for each issued query. Query F, for example, specifies conversion days 1 and 2, and returns interaction data that indicates that conversions C1 and C3 occurring over the specified days may be attributed a non-conversion interaction associated with third party Site A, and that conversion C2 may be attributed to a non-conversion interaction associated with third party Site B. Query G, for example, specifies conversion days 2 and 3, and returns interaction data that indicates that conversions C3 and C4 occurring over the specified days may be attributed to a non-conversion interaction associated with third party Site A, and that conversion C5 may be attributed to a non-conversion interaction associated with third party Site B. Query H, for example, specifies conversion days 1, 2, and 3, and returns interaction data that indicates that conversions C1, C3, and C4 occurring over the specified days may be attributed to a non-conversion interaction associated with third party Site A, and that conversions C2 and C5 may be attributed to a non-conversion interaction associated with third party site B.

As shown in FIG. 5B, for example, the party can be provided with a relatively limited query view 550 of the interaction data 400 that includes data values for conversion interaction dimensions, and aggregated data values corresponding to non-conversion interaction dimensions, for each issued query. Query F, for example, specifies conversion days 1 and 2, and returns interaction data that indicates that conversions C1, C2, and C3 occurred over the specified days, and that of the total number of conversions, two of the conversions may be attributed to a non-conversion interaction associated with third party Site A, and one of the conversions may be attributed to a non-conversion interaction associated with third party Site B. Query G, for example, specifies conversion days 2 and 3, and returns interaction data that indicates that conversions C3, C4, and C5 occurred over the specified days, and that of the total number of conversions, two of the conversions may be attributed to a non-conversion interaction associated with third party Site A, and one of the conversions may be attributed to a non-conversion interaction associated with third party Site B. Query H, for example, specifies conversion days 1, 2, and 3, and returns interaction data that indicates that conversions C1, C2, C3, C4, and C5 occurred over the specified days, and that of the total number of conversions, three of the conversions may be attributed to a non-conversion interaction associated with third party Site A, and two of the conversions may be attributed to a non-conversion interaction associated with third party Site B.

Although aggregated count values corresponding to non-conversion interaction dimensions have been provided to the party through Queries F, G, and H, for example, the party may possibly leverage the information it already has relevant to the conversion interactions in an attempt to discover discrete non-conversion interaction dimension values for particular users. As shown in FIG. 4 and FIG. 5, for example, the party has conversion interaction data that indicates that conversion C1 was performed by User1 on Day 1, conversion C2 was performed by User 2 on Day 1, conversion 03 was performed by User3 on Day 2, conversion 04 was performed by User4 on Day 3, and conversion C5 was performed by User5 on Day 3—but the party does not have discrete information related which specific users performed which specific non-conversion interactions (e.g., interactions with third party Site A and third party Site B) that may have led to the conversion interactions. In attempt to discover discrete non-conversion interaction data, for example, the party may perform a differential query attack in which Query F and Query G results are added, then Query H results are subtracted. In the present example, the party knows that according to the added results of Query F and Query G, a total of four non-conversion interactions occurred with Site A, and a total of two non-conversion interactions occurred with Site B. According to the results of Query H (which is based on a time range that spans that of Queries F and G), three non-conversion interactions occurred with Site A and two non-conversion interactions occurred with Site B. By performing ((Query F+Query G)−Query H), for example, the party can determine that on Day 2, one non-conversion interaction (four minus three) occurred with Site A, and that zero non-conversion interactions (two minus two) occurred with site B. The party also has conversion interaction data that indicates that conversion C3 by User3 occurred on Day 2. Thus, in the present example, by the party may infer that User3 performed a non-conversion interaction with SiteB—such an inference represents a data leakage risk.

To assess a data leakage risk for query results provided to a party, for example, the system 100 (shown in FIG. 1) can determine whether a differential query attack may have occurred. In general, performing a brute force analysis on all queries issued by the party may be computationally expensive and may consume a vast amount of storage space. To conserve system processing and storage resources, and to perform faster data analysis, for example, the system 100 can perform relatively inexpensive techniques for identifying potential data leaks (e.g., by determining a subset of queries issued by the party that identifies a single user or a small set of users), and can then perform brute force analysis to confirm whether the data leaks were part of an actual data attack. Further, the system 100 may also perform measures for preventing further attacks, as described in further detail below.

Referring again to FIG. 2, a plurality of dimension combinations is determined (206). In general, a dimension combination represents the smallest unit by which a party can identify a set of conversion interactions. Each dimension combination, for example, can correspond to a different combination of values for the one or more conversion dimensions (e.g., dimensions that are known to the party) represented in the interaction data 120 (shown in FIG. 1). For example, if the interaction data 120 were to include values for a set of conversion dimensions (e.g., including Conversion Day, Conversion Type, Conversion Device Type, and Conversion Location), each dimension combination would be a tuple (e.g., a quadruple) that specifies the different combinations of conversion interaction values that occur in the interaction data for the conversion dimensions.

Figure 6:
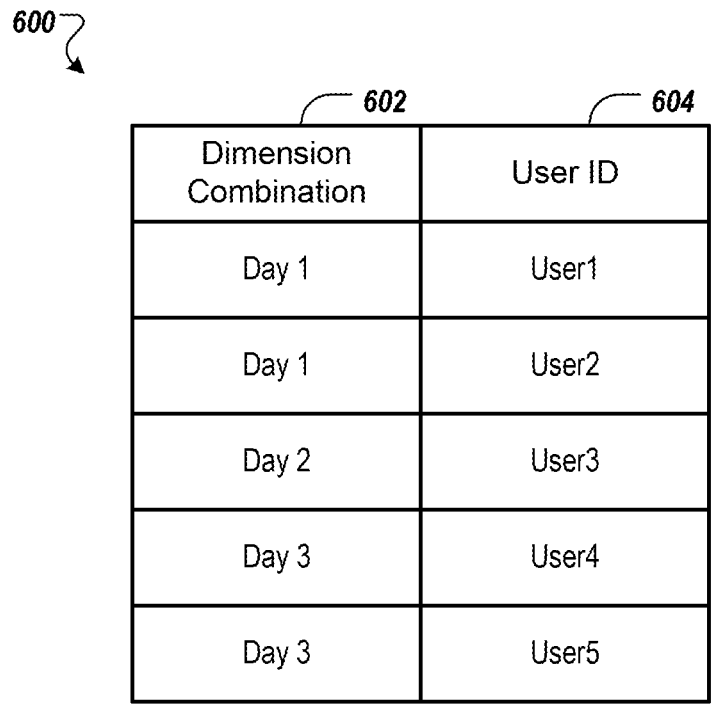
FIG. 6 shows an example of dimension combination data.

Referring now to FIG. 6, for example, an example of dimension combination data 600 is shown. For example, the dimension combination data 600 can be based on the interaction data 400 (shown in FIG. 4), and can include, for each conversion interaction that occurred between various entities and a party, a dimension combination 602 that includes one or more conversion interaction values in the interaction data, and a User ID 604 that corresponds to an entity (e.g., a user) that performed the conversion interaction. In the present example, given the set of conversion interactions represented in the interaction data 400 (e.g., conversion interactions C1, C2, C3, C4, and C5), a dimension combination that includes a conversion interaction value of Conversion Day 1 is associated with a user set that includes User 1 and User 2, a dimension combination that includes a conversion interaction value of Conversion Day 2 is associated with a user set that includes User 3, and a dimension combination that includes a conversion interaction value of Day 3 is associated with a user set that includes User 4 and User 5. Each dimension combination 602 in the present example includes a single conversion dimension (e.g., Conversion Day), however other examples of dimension combinations may include multiple conversion dimensions.

Referring again to FIG. 2, for each query of the plurality of queries described in the query data, each dimension combination from the plurality of dimension combinations that appears in a result to the query is identified (208). For example, the system 100 (shown in FIG. 1) can identify each dimension combination from the plurality of dimension combinations 602 (shown in FIG. 6) that appears in a query result (e.g., one or more result rows) that was previously provided to the party for one or more of Query F, Query G, and Query H (shown in FIG. 5B), according to the query data 122. As shown in FIG. 1, for example, dimension combination matches that have been identified for each query result row included in the query data 122 can be received by the query membership generator 104 from the interaction information data store 102 as matched dimension combination data 124.

Figure 7:
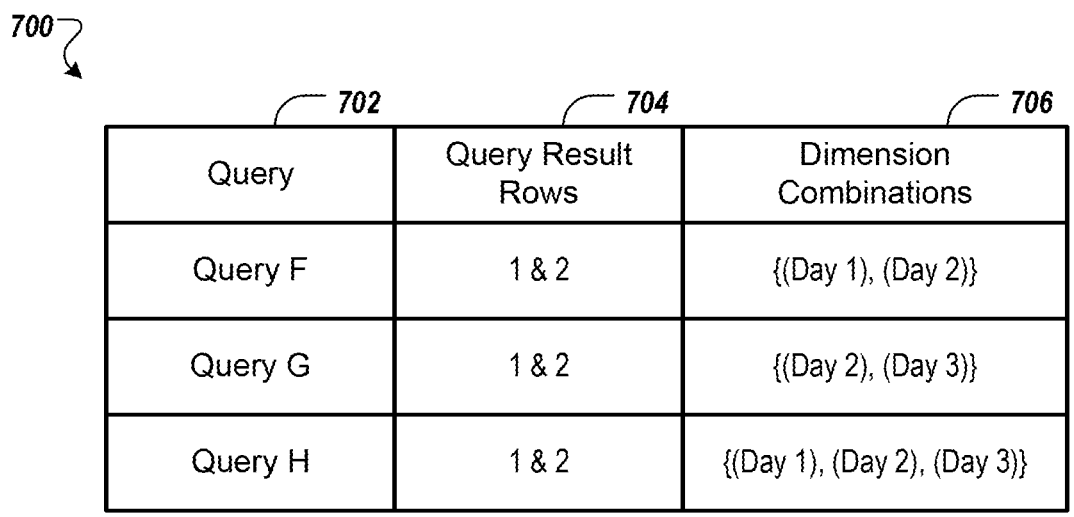
FIG. 7 shows an example of matched dimension combination data.

Referring now to FIG. 7, an example of matched dimension combination data 700 is shown. For example, the matched dimension combination data 700 (e.g., similar to the matched dimension combination data 124, shown in FIG. 1) can specify, for each query 702 that was previously issued by the party (e.g., Query F, Query G, and Query H, shown in FIG. 5B), one or more query result rows 704 that were returned by the query, and one or more matching dimension combinations 706 that are included in the query result rows. In the present example, Query F had returned query result rows 1 and 2 (e.g., a first row that includes an aggregation of non-conversion interactions with Site A, and a second row that includes an aggregation of non-conversion interactions with Site B), and had included dimension combinations Day 1 and Day 2 in the query results. Query G, for example, had returned query result rows 1 and 2, and had included dimension combinations Day 2 and Day 3 in the query results. Query H, for example, had returned query result rows 1 and 2, and had included dimensions combinations Day 1, Day 2, and Day 3 in the query results.

For each dimension combination of the plurality of dimension combinations, a query membership tag is generated (210). For example, the query membership generator 104 (shown in FIG. 1) can determine query membership data 126 for the each of the dimension combinations included in the received matched dimension combination data 124. A query membership tag for a dimension combination can identify each query from the plurality of queries for which the dimension combination appears in a result to the query. For example, for each dimension combination that appears in a result to one or more of the queries F, G, and H (shown in FIG. 5B) that were previously issued by the party, the query membership generator 104 can generate a tag that specifies associations between the dimension combination and one or more of the issued queries. In some implementations, query membership tag data may be stored for further processing and analysis. For example, the query membership data 126 may be stored by the interaction information data store 102 and/or the query information data store 106 and can be accessed for analysis with respect to future issued queries.

Referring now to FIG. 8, an example of query membership tag data 800 is shown. For example, the query membership tag data 800 can specify, for each dimension combination 802 that appears in a result to one or more of the queries F, G, and H (shown in FIG. 5B), a query membership tag 804 that specifies which particular queries have returned the dimension combination in its query result values. In some implementations, query membership tags may include a series of values (e.g., 0s and 1s) that represent a dimension combination's existence in each result row of a set of queries. For example, a value of 1 can indicate that a dimension combination is matched by (e.g., exists in) a specific query result row, and a value of 0 can indicate that the dimension combination is not matched by (e.g., does not exist in) a specific query result row. In the present example, a dimension value of Day 1 has appeared in a query result for Query F (e.g., in rows 1 and 2), has not appeared in a query result for Query G, and has appeared in a query result for Query H (e.g., in rows 1 and 2), as specified by query membership tag (1, 0, 1). The dimension value of Day 2, for example, has appeared in a query result for Query F (e.g., in rows 1 and 2), Query G (e.g., in rows 1 and 2), and Query H (e.g., in rows 1 and 2), as specified by query membership tag (1, 1, 1). The dimension value of Day 3, for example, has not appeared in a query result for Query F, but has appeared in a query result for Query G (e.g., in rows 1 and 2), and Query H (e.g., in rows 1 and 2), as specified by query membership tag (0, 1, 1). In other examples, different dimension combinations may have the same query membership tag if the dimension combinations are matched in the same queries and the same query rows.

For each unique query membership tag, a count of a number of entities is determined, the entities being associated in the interaction data with any interaction having a dimension combination that corresponds to the query membership tag (212). As shown in FIG. 1, for example, the query membership generator 104 can provide the query membership data 126 to the interaction information data store 102, and the system 100 can use the differential query analyzer (filter) 108 analyze the query membership data 126 in view of the interaction data 120 stored by the interaction information data store 102, and the query data 122 stored by the query information data store 106. For example, the differential query analyzer (filter) 108 can group any dimension combinations 802 in the query membership tag data 800 that share the same membership tag 804 (shown in FIG. 8), and can determine, for each membership tag, a set of entity identifiers (e.g., User IDs) that are associated with its corresponding dimension combinations in the interaction data 400 (shown in FIG. 4).

Referring now to FIG. 9, an example of entity association data 900 for query membership tags is shown. For example, the entity association data 900 can specify, for each query membership tag 902 (e.g., similar to the query membership tags 804, shown in FIG. 8), one or more dimension combinations 904 that correspond to the membership tag, and a set of User IDs 906 that are associated in the interaction data 400 (shown in FIG. 4) with an interaction that includes interaction values that correspond to the one or more dimension combinations. In the present example, the query membership tag of (1, 0, 1) corresponds to the dimension combination Day 1, which is associated in the interaction data 400 with a set of user identifiers including User1 and User2. The query membership tag of (1, 1, 1), for example, corresponds to the dimension combination of Day 2, which is associated in the interaction data 400 with a set of user identifiers including User3. The query membership tag of (0, 1, 1), for example, corresponds to the dimension combination of Day 3, which is associated in the interaction data with a set of user identifiers including User4 and User5.

Referring again to FIG. 2, a data leakage risk is assessed for the party based on the counts for one or more unique query membership tags (214). For example, the differential query analyzer (filter) 108 (shown in FIG. 1) can, for each query membership tag 902 (shown in FIG. 9), determine a count of a set of entities (e.g., users identifiers) associated with the query membership tag and determine whether any query membership tags are associated with entity counts under an identifiable threshold value (e.g., 2 entities, 10 entities, 50 entities, or another suitable value). When assessing the data leakage risk, for example, entity counts may be determined rather than conversion interaction counts, because each conversion may be associated with more than one non-conversion interaction. In the present example, the query membership tag (1, 0, 1) is associated with an entity count of two (e.g., including User1 and User2), the query membership tag (1, 1, 1) is associated with an entity count of one (e.g., including User3), and the query membership tag (0, 1, 1) is associated with an entity count of two (e.g., including User4 and User5). If all of the query membership tags 902 were associated with no less than a threshold entity count value, for example, the differential query analyzer (filter) 108 may determine that no query attack occurred.

However, considering a threshold value of two entities, for example, the differential query analyzer (filter) 108 can identify a potential data leak 128 for query membership tag (1, 1, 1), which is associated with only one entity, and thus under the threshold entity count value.

After determining that a potential data leak occurred, for example, the system 100 (shown in FIG. 1) can use the comprehensive differential query analyzer 110 to perform further analysis with respect to one or more queries indicated by a query membership tag associated with the potential data leak 128. For example, the comprehensive differential query analyzer 110 can automatically apply a relatively comprehensive analysis process to the one or more queries in response to identifying the potential data leak 128, or can provide a system administrator with information related to the potential data leak 128, and then apply the comprehensive analysis process in response to receiving input from the system administrator. In the present example, query membership tag (1, 1, 1) indicates that the potential data leak 128 may be attributed to one or more combinations of the queries represented in the tag (e.g., Query F, Query G, and Query H, shown in FIG. 5B) having been issued by a party. Thus, in the present example, the comprehensive differential query analyzer 110 can perform a selected brute force analysis which computes various XOR combinations of the relevant subset of queries that have been previously issued by the party and have been stored in the query information data store 106. For example, 2-query XOR combinations of the relevant subset of queries can be computed, then 3-query XOR combinations can be computed, and so forth, until a query combination that represents a confirmed data leak 130 is discovered.

In the present example, Query F, Query G, and Query H are selected by the comprehensive differential query analyzer 110 for a brute force analysis, which may be conducted according to the following example:

$QF \oplus QG = \text{ID}\{\text{Tag}(1,0,0),\text{Tag}(1,0,1),\text{Tag}(0,0,1),\text{Tag}(0,1,1)\} = \text{ID}(\{\text{Day1},\text{Day3}\}) = \{\text{User1},\text{User2},\text{User4},\text{User5}\} \Rightarrow |QF \oplus QG| > \text{threshold} \Rightarrow QF \oplus QG$ is safe;     1.

$QF \oplus QH = \text{ID}\{\text{Tag}(1,0,0),\text{Tag}(1,1,0),\text{Tag}(0,0,1),\text{Tag}(0,1,1)\} = \text{ID}(\{\text{Day3}\}) = \{\text{User4},\text{User5}\} \Rightarrow |QF \oplus QH| > \text{threshold} \Rightarrow QF \oplus QH$ is safe;     2.

$QG \oplus QH = \text{ID}(\{\text{Tag}(0,1,0),\text{Tag}(1,1,0),\text{Tag}(0,0,1),\text{Tag}(1,0,1)\}) = \text{ID}(\{\text{Day1}\}) = \{\text{User1},\text{User2}\} \Rightarrow |QG \oplus QH| > \text{threshold} \Rightarrow QG \oplus QH$ is safe;     3.

$QF \oplus QG \oplus QH = \text{ID}(\{\text{Tag}(0,0,1),\text{Tag}(0,1,0),\text{Tag}(1,0,0),\text{Tag}(1,1,1)\}) = \text{ID}(\{\text{Day2}\}) = \{\text{User 3}\} < \text{threshold} \Rightarrow QF \oplus QG \oplus QH$ is a confirmed data leak.     4.

After confirming that an actual data leak has occurred, for example, the comprehensive differential query analyzer 110 (shown in FIG. 1) can provide information associated with the confirmed data leak 130 to the data leak information data store 112 for storage. For example, the information associated with the confirmed data leak 130 can include an identifier of a party that issued a set of queries which resulted in the confirmed data leak 130, timestamps associated with each query in the set of issued queries, a list of entities for which data has been leaked, and a list of non-conversion (e.g., private) interaction dimensions that have been leaked. To determine the non-conversion interaction dimensions that have been leaked, for example, the comprehensive differential query analyzer 130 can find an intersection of non-conversion interaction dimensions for the issued queries. In the present example, the data leak information data store 112 can store information including the party that issued Query F, Query G, and Query H, a timestamp for each of the queries, and that non-conversion interaction data (e.g., a visited third party website SiteA) has been leaked for User3.

In some implementations, one or more security actions may be performed by the system 100 in response to confirming that a data leak has occurred. Security actions can be performed automatically, for example, or can be performed after receiving input from a system administrator. For example, a data leak reporting system (not shown) can reference the data leak information data store 112 and generate an alert that provides information associated with the confirmed data leak 130. As another example, a data leak prevention system (not shown) can identify possibly malicious parties (e.g., parties having issued queries that indicate a data attack) and can restrict further issued queries by the party. For example, the data leak prevention system may restrict dimensions that may be selected by the party for reporting purposes, restrict time ranges selected by the party for reporting purposes, or enforce another suitable query parameter restriction such that future differential query attacks may not be performed by the party. Another possible action that may be performed by the system 100 in response to identifying repeated data attacks by a party is to prevent the party from issuing further queries.

Figure 10:
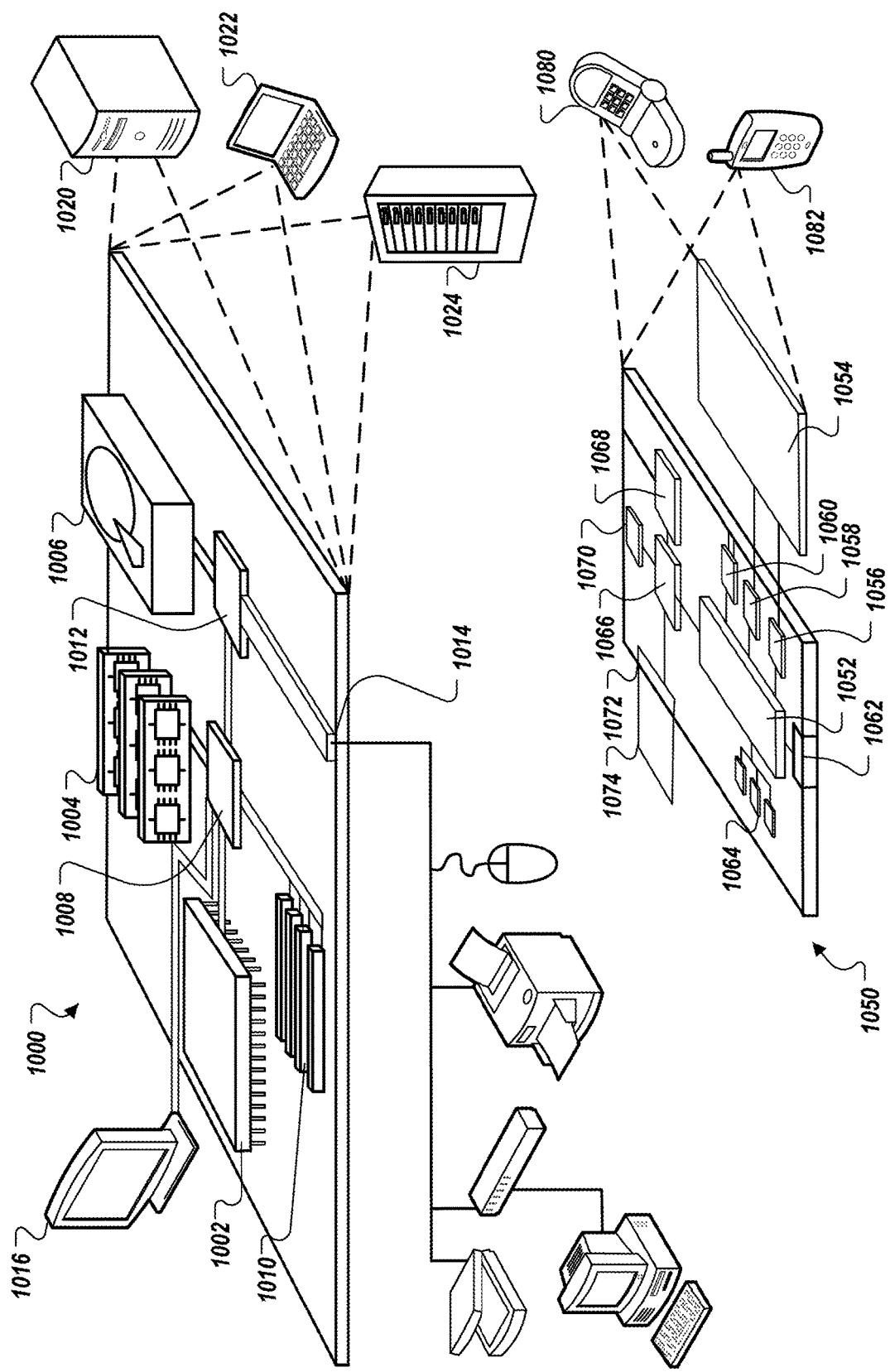
FIG. 10 is a block diagram of example computing devices that may be used to implement the systems and methods described in this document.

FIG. 10 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. Additionally, computing device 1000 or 1050 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. Additionally, the processor may be implemented using any of a number of architectures. For example, the processor 1010 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques, described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

The invention claimed is:

1. A computer-implemented method, comprising:
   receiving, by a computing system, interaction data for a party, wherein the interaction data describes a set of interactions that have occurred between the party and a plurality of entities, and the interaction data further identifies, for each interaction, (i) values for one or more dimensions of the interaction and (ii) an entity identifier for one of the plurality of entities that participated in the interaction with the party;
   receiving, by the computing system, query data for the party, wherein the query data describes a plurality of queries issued by the party with respect to the set of interactions that have occurred between the party and the plurality of entities;
   determining, by the computing system, a plurality of dimension combinations, each dimension combination corresponding to a different combination of values for the one or more dimensions represented in the interaction data;
   identifying, by the computing system and for each query of the plurality of queries described in the query data, each dimension combination from the plurality of dimension combinations that appears in a result to the query;
   generating, by the computing system and for each dimension combination of the plurality of dimension combinations, a query membership tag that identifies each query from the plurality of queries for which the dimension combination appears in a result to the query;
   determining, by the computing system and for each unique query membership tag, a count of a number of entities that are associated in the interaction data with any interaction having a dimension combination that corresponds to the query membership tag; and
   assessing a data leakage risk for the party based on the counts for one or more unique query membership tags.

2. The computer-implemented method of claim 1, wherein receiving the interaction data for the party includes receiving conversion interaction data that is known to the party, the set of interactions including conversion interactions that have occurred between the plurality of entities and one or more web properties of the party.

3. The computer-implemented method of claim 2, wherein the conversion interaction data is received from the party.

4. The computer-implemented method of claim 1, wherein receiving the interaction data for the party includes receiving non-conversion interaction data that is unknown to the party, the set of interactions including non-conversion interactions that have occurred between the plurality of entities and one or more third party web properties.

5. The computer-implemented method of claim 4, wherein the non-conversion interaction data is received from a notification item provision system.

6. The computer-implemented method of claim 1, wherein the plurality of dimension combinations determined by the computing system includes only conversion interactions values that are known to the party.

7. The computer-implemented method of claim 1, wherein two or more different dimension combinations that appear in a same result to the query have a same query membership tag.

8. The computer-implemented method of claim 1, wherein assessing the data leakage risk for the party includes determining whether the count of the number of entities for any of the unique query membership tags is under an identifiable threshold value.

9. The computer-implemented method of claim 1, further comprising:
   after identifying a potential data leak corresponding to a given query membership tag based on assessing the data leakage risk for the party, performing a differential query analysis of combinations of queries identified in the given query membership tag to determine whether an actual data leak occurred.

10. The computer-implemented method of claim 9, further comprising performing one or more security actions, in response to determining that the actual data leak has occurred.

11. The computer-implemented method of claim 10, wherein the one or more security actions include restricting further queries issued by the party.

12. The computer-implemented method of claim 10, wherein the one or more security actions are automatically performed by the computing system.

13. The computer-implemented method of claim 10, wherein the one or more security actions are performed after receiving input from an administrator of the computing system.

14. One or more non-transitory computer-readable media having instructions stored thereon that, when executed by data processing apparatus of a computing system, cause performance of operations comprising:
   receiving, by the computing system, interaction data for a party, wherein the interaction data describes a set of interactions that have occurred between the party and a plurality of entities, and the interaction data further identifies, for each interaction, (i) values for one or more dimensions of the interaction and (ii) an entity identifier for one of the plurality of entities that participated in the interaction with the party;
   receiving, by the computing system, query data for the party, wherein the query data describes a plurality of queries issued by the party with respect to the set of interactions that have occurred between the party and the plurality of entities;

determining, by the computing system, a plurality of dimension combinations, each dimension combination corresponding to a different combination of values for the one or more dimensions represented in the interaction data;

identifying, by the computing system and for each query of the plurality of queries described in the query data, each dimension combination from the plurality of dimension combinations that appears in a result to the query;

generating, by the computing system and for each dimension combination of the plurality of dimension combinations, a query membership tag that identifies each query from the plurality of queries for which the dimension combination appears in a result to the query;

determining, by the computing system and for each unique query membership tag, a count of a number of entities that are associated in the interaction data with any interaction having a dimension combination that corresponds to the query membership tag; and assessing a data leakage risk for the party based on the counts for one or more unique query membership tags.

15. The one or more non-transitory computer-readable media of claim 14, wherein receiving the interaction data for the party includes receiving conversion interaction data that is known to the party, the set of interactions including conversion interactions that have occurred between the plurality of entities and one or more web properties of the party.

16. The one or more non-transitory computer-readable media of claim 15, wherein the conversion interaction data is received from the party.

17. The one or more non-transitory computer-readable media of claim 14, wherein receiving the interaction data for the party includes receiving non-conversion interaction data that is unknown to the party, the set of interactions including non-conversion interactions that have occurred between the plurality of entities and one or more third party web properties.

18. The one or more non-transitory computer-readable media of claim 17, wherein the non-conversion interaction data is received from a notification item provision system.

19. The one or more non-transitory computer-readable media of claim 14, wherein the plurality of dimension combinations determined by the computing system includes only conversion interactions values that are known to the party.

20. A system, comprising:

data processing apparatus; and non-transitory computer-readable media having instructions encoded thereon that, when executed by the data processing apparatus, cause performance of operations comprising:

receiving interaction data for a party, wherein the interaction data describes a set of interactions that have occurred between the party and a plurality of entities, and the interaction data further identifies, for each interaction, (i) values for one or more dimensions of the interaction and (ii) an entity identifier for one of the plurality of entities that participated in the interaction with the party;

receiving query data for the party, wherein the query data describes a plurality of queries issued by the party with respect to the set of interactions that have occurred between the party and the plurality of entities;

determining a plurality of dimension combinations, each dimension combination corresponding to a different combination of values for the one or more dimensions represented in the interaction data;

identifying, for each query of the plurality of queries described in the query data, each dimension combination from the plurality of dimension combinations that appears in a result to the query;

generating, for each dimension combination of the plurality of dimension combinations, a query membership tag that identifies each query from the plurality of queries for which the dimension combination appears in a result to the query;

determining, for each unique query membership tag, a count of a number of entities that are associated in the interaction data with any interaction having a dimension combination that corresponds to the query membership tag; and assessing a data leakage risk for the party based on the counts for one or more unique query membership tags.

* * * * *